United States Patent
McCartney et al.

(10) Patent No.: US 10,360,543 B2
(45) Date of Patent: Jul. 23, 2019

(54) SCRAPING RESISTANT SYSTEM AND METHOD FOR PLACING ORDERS THROUGH AN INTERNET SHOPPING SERVICE

(75) Inventors: Daniel John McCartney, Chicago, IL (US); Michael Gabriel Leiseca, Oak Park, IL (US); Ryan Robert Bowersock, Chicago, IL (US); John Saxton Kent, Chicago, IL (US); Jacob Lyman Battle, Skokie, IL (US); Joshua Evnin, Chicago, IL (US); Rhiannon Sterling Zivin, Chicago, IL (US); Matthew Maloney, Chicago, IL (US)

(73) Assignee: GrubHub Holdings Inc., Chicago, IL (US)

( * ) Notice: Subject to any disclaimer, the term of this patent is extended or adjusted under 35 U.S.C. 154(b) by 1789 days.

(21) Appl. No.: 13/453,159

(22) Filed: Apr. 23, 2012

(65) Prior Publication Data

US 2013/0282516 A1    Oct. 24, 2013

(51) Int. Cl.
| | |
|---|---|
| *G06Q 20/12* | (2012.01) |
| *G06Q 30/06* | (2012.01) |
| *H04L 29/08* | (2006.01) |
| *G06Q 50/00* | (2012.01) |

(52) U.S. Cl.
CPC ......... *G06Q 20/12* (2013.01); *G06Q 30/0631* (2013.01); *G06Q 50/01* (2013.01); *H04L 67/32* (2013.01)

(58) Field of Classification Search
CPC ............... G06Q 30/0631; G06Q 50/01; G06Q 20/00–425; G06Q 50/00–34; G06Q 67/00–42; H04L 67/32
See application file for complete search history.

(56) References Cited

U.S. PATENT DOCUMENTS

| | | |
|---|---|---|
| 4,530,067 A | 7/1985 | Dorr |
| 4,547,851 A | 10/1985 | Kurland |
| 5,189,411 A | 2/1993 | Collar |
| 5,272,474 A | 12/1993 | Hilliard |
| 5,367,557 A | 11/1994 | Ozenbaugh |
| 5,510,979 A | 4/1996 | Moderi |

(Continued)

FOREIGN PATENT DOCUMENTS

| | | |
|---|---|---|
| EP | 0 844 579 A2 | 5/1998 |
| EP | 0 856 812 A2 | 5/1998 |

(Continued)

OTHER PUBLICATIONS

Kevin Crowston, Understanding Processes in Organizations, Jul. 1998.

(Continued)

*Primary Examiner* — Calvin L Hewitt, II
*Assistant Examiner* — Yingying Zhou
(74) *Attorney, Agent, or Firm* — Hickman Palermo Becker Bingham LLP

(57) ABSTRACT

A third-party server exposes a first set of data from a content based website. Access to a second set of data requires that a token be assigned to a specific web browser and corresponding to a specific subset of protected data, the token containing no information that can be used to gain access to other protected data.

8 Claims, 10 Drawing Sheets

(56) References Cited

U.S. PATENT DOCUMENTS

| | | | |
|---|---|---|---|
| 5,570,283 A | 10/1996 | Shoolery | |
| 5,745,681 A | 4/1998 | Levine | |
| 5,751,958 A | 5/1998 | Zweben | |
| 5,774,670 A | 6/1998 | Montulli | |
| 5,781,189 A | 7/1998 | Holleran | |
| 5,835,896 A | 11/1998 | Fisher | |
| 5,838,798 A | 11/1998 | Stevens | |
| 5,839,115 A | 11/1998 | Coleman | |
| 5,842,176 A | 11/1998 | Hunt | |
| 5,845,263 A | 12/1998 | Camaisa | |
| 5,850,214 A | 12/1998 | McNally | |
| 5,892,900 A * | 4/1999 | Ginter | G06F 21/10 726/26 |
| 5,912,743 A | 6/1999 | Kinebuchi | |
| 5,948,040 A | 9/1999 | DeLorme | |
| 5,966,068 A | 10/1999 | Wicks | |
| 5,970,474 A | 10/1999 | LeRoy | |
| 5,991,739 A * | 11/1999 | Cupps | G06Q 10/08 705/26.61 |
| 6,134,548 A | 10/2000 | Gottsman | |
| 6,167,255 A | 12/2000 | Kennedy | |
| 6,175,922 B1 | 1/2001 | Wang | |
| 6,208,976 B1 | 3/2001 | Kinebuchi | |
| 6,226,618 B1 * | 5/2001 | Downs | G06F 21/10 380/279 |
| 6,236,974 B1 | 5/2001 | Kolawa | |
| 6,282,491 B1 | 8/2001 | Bochmann | |
| 6,295,541 B1 | 9/2001 | Bodnar | |
| 6,300,947 B1 | 10/2001 | Kanevsky | |
| 6,341,268 B2 | 1/2002 | Walker | |
| 6,356,543 B2 | 3/2002 | Hall | |
| 6,366,650 B1 | 4/2002 | Rhie | |
| 6,384,850 B1 | 5/2002 | McNally et al. | |
| 6,415,138 B2 | 7/2002 | Sirola | |
| 6,590,588 B2 | 7/2003 | Lincke | |
| 6,594,347 B1 | 7/2003 | Calder | |
| 6,678,733 B1 * | 1/2004 | Brown | H04L 63/0209 709/203 |
| 6,836,537 B1 | 12/2004 | Zirngibl | |
| 6,871,325 B1 | 3/2005 | McNally et al. | |
| 6,873,693 B1 | 3/2005 | Langseth | |
| 6,973,437 B1 | 12/2005 | Olewicz | |
| 6,976,004 B2 | 12/2005 | Wittrup | |
| 6,982,733 B1 | 1/2006 | McNally et al. | |
| 7,069,228 B1 | 6/2006 | Rose | |
| 7,216,152 B2 | 5/2007 | Short | |
| 7,277,717 B1 | 10/2007 | Hart | |
| 7,295,920 B2 | 11/2007 | Finkelstein | |
| 7,359,871 B1 | 4/2008 | Paasche et al. | |
| 7,386,477 B2 | 6/2008 | Fano | |
| 7,437,305 B1 | 10/2008 | Kantarjiev | |
| 7,895,445 B1 * | 2/2011 | Albanese | G06F 21/335 713/172 |
| 7,966,215 B1 | 6/2011 | Myers | |
| 8,073,723 B1 | 12/2011 | Bilibin et al. | |
| 8,146,077 B2 | 3/2012 | McNally et al. | |
| 8,326,705 B2 | 12/2012 | Niessen et al. | |
| 8,341,003 B1 | 12/2012 | Bilibin et al. | |
| 2001/0047301 A1 | 11/2001 | Walker | |
| 2002/0005430 A1 | 1/2002 | Pentel | |
| 2002/0046093 A1 | 4/2002 | Miller | |
| 2002/0107747 A1 | 8/2002 | Gerogianni | |
| 2002/0143655 A1 | 10/2002 | Elston | |
| 2002/0161604 A1 | 10/2002 | Kardos | |
| 2002/0178034 A1 | 11/2002 | Gardner | |
| 2003/0125963 A1 | 7/2003 | Haken | |
| 2005/0004843 A1 | 1/2005 | Heflin | |
| 2005/0049940 A1 | 3/2005 | Tengler | |
| 2006/0010037 A1 | 1/2006 | Angert et al. | |
| 2006/0020497 A1 * | 1/2006 | McNally | G06Q 10/02 705/5 |
| 2006/0069578 A1 | 3/2006 | Borkowski et al. | |
| 2006/0080176 A1 | 4/2006 | Sutcliffe | |
| 2007/0011061 A1 | 1/2007 | East | |
| 2007/0150375 A1 | 6/2007 | Yang | |
| 2007/0294129 A1 * | 12/2007 | Froseth | G06Q 10/08 705/7.32 |
| 2008/0076451 A1 | 3/2008 | Sheha et al. | |
| 2008/0104059 A1 | 5/2008 | Segel | |
| 2008/0133488 A1 * | 6/2008 | Bandaru | G06F 17/30864 |
| 2008/0319864 A1 | 12/2008 | Leet | |
| 2009/0048890 A1 | 2/2009 | Burgh | |
| 2009/0099972 A1 | 4/2009 | Angert et al. | |
| 2009/0106124 A1 | 4/2009 | Yang | |
| 2009/0150193 A1 | 6/2009 | Hong | |
| 2009/0167553 A1 | 7/2009 | Hong | |
| 2009/0204492 A1 | 8/2009 | Scifo et al. | |
| 2009/0307096 A1 | 12/2009 | Antonellis | |
| 2009/0319166 A1 | 12/2009 | Khosravy et al. | |
| 2010/0070376 A1 | 3/2010 | Proud et al. | |
| 2010/0250384 A1 | 9/2010 | Bhargava | |
| 2010/0268620 A1 | 10/2010 | Angert | |
| 2011/0040642 A1 | 2/2011 | O'Dell | |
| 2011/0161137 A1 | 6/2011 | Ubalde et al. | |
| 2011/0191194 A1 | 8/2011 | Lutnick et al. | |
| 2011/0208617 A1 * | 8/2011 | Weiland | G06Q 30/0641 705/27.1 |
| 2011/0218839 A1 | 9/2011 | Shamaiengar | |
| 2011/0258011 A1 | 10/2011 | Burns | |
| 2012/0016863 A1 * | 1/2012 | Bernhardt | G06F 17/30705 707/710 |
| 2012/0191551 A1 * | 7/2012 | Lutnick | G06Q 20/20 705/15 |
| 2012/0203619 A1 | 8/2012 | Lutnick et al. | |
| 2012/0290413 A1 | 11/2012 | Harman | |
| 2013/0038800 A1 | 2/2013 | Yoo | |
| 2013/0097054 A1 * | 4/2013 | Breitenbach | G06Q 30/06 705/26.8 |
| 2013/0103605 A1 | 4/2013 | Villegas | |
| 2013/0144730 A1 | 6/2013 | Harman | |
| 2013/0144764 A1 | 6/2013 | Walling, III | |
| 2013/0295999 A1 * | 11/2013 | Wang | H04M 3/44 455/564 |
| 2013/0332253 A1 * | 12/2013 | Shiffert | G06Q 30/0239 705/14.26 |

FOREIGN PATENT DOCUMENTS

| | | |
|---|---|---|
| EP | 1 081 625 A2 | 7/2001 |
| JP | 62-050919 | 3/1987 |
| JP | 5-40767 | 2/1993 |
| JP | 6-52195 | 2/1994 |
| JP | 6-203051 | 7/1994 |
| JP | 9-160972 | 6/1997 |
| JP | 9-204466 | 8/1997 |
| JP | 9-296819 | 11/1997 |
| JP | 9-325988 | 12/1997 |
| JP | 9-330470 | 12/1997 |
| JP | 10-011194 | 1/1998 |
| JP | 10-224549 | 8/1998 |
| JP | 11-126147 | 5/1999 |
| JP | 11-191035 | 7/1999 |
| JP | 11-202974 | 7/1999 |
| WO | WO 95/34040 A1 | 12/1995 |
| WO | WO 97/08635 A1 | 3/1997 |
| WO | WO 98/35311 A1 | 8/1998 |
| WO | WO 99/17236 A1 | 4/1999 |
| WO | 2001071617 | 9/2001 |

OTHER PUBLICATIONS

Engaging Customers Across All Touch Points: A Roadmap for Leading Retailers, Blue Martini Software, Inc., www.bluemartini.com.

Chuck Andraka, Put your database on the Web, Data Based Advisor, v14, n6, p. 12, Jun. 1996.

Steven Vaughan-Nichols, Unleashing Databases on the Web—True wealth and power belong to those who control information access, Netguide, 1996, n307, p. 111.

P.L. Olympia, Cold Fusion 1.5; Autobahn, DBMS, v9, n8, p. 33, Jul. 1996.

(56) References Cited

OTHER PUBLICATIONS eshop.com, eShop Technology, eshop.com, Jan. 1, 1996.
eshop.com, eShip Technology Merchant Manual, eShop.com, Feb. 21, 1996.
Kambe Tomonari, Screen design simulator "U-face", Information Processing Society of Japan (IPSJ) The 39th National convention colleciton of papers, 1457-1458, Oct. 16, 1989.
Kato Kiyosh, A Prototype of a User Interface Software for Portable Terminal with a Small Display Screen, Information Processing Society of Japan (IPSJ) The 53rd National co . . . .
Squirrel Systems, May 8, 1999, http://web.archive.org/web/19990508153731/www.squirrelsystems.com/about/company.
Robin Berger, POS Positions Spago for Growth, Squirrel Systems, Apr./May 1997.
Squirrel Systems, POS System, May 8, 1999, http://web.archive.org/web/19990508175824/www.squirrelsystems.com/products/newsq . . . .
Squirrel Systems, Squirrel Restaurant Management System.
Squirrel Systems, Press Releases, Squirrel Systems, Aug. 20, 1998.
Business Editors, Fujitsu and Sulcus Hospitality Group partner to develop first wireless computer for restaurant industry, Business Wire, Aug. 30, 1993.
Sulcus's Squirrel and cybermeals Ink Technology Alliance, Business Wire, Feb. 24, 1998.
Accel Partners Invest $10 Million incybermeals, Business Wire, May 28, 1998.
Rev Share Information, Cybermeals, Jan. 24, 1998.
Squirrel point-of-sale software, Squirrel Systems, Oct. 10, 1999.
Chapter 4—Wireless Data, Wireless Technologies and the National Information Infrastructure, Diane Pub Co, Oct. 1995.
Brew Moon Management Toasts SQUiRREL's "Seamless Solution", SQUiRREL Systems, Nov. 1998.
Squirrel Systems, Squirrel® Customer Profile: Chevys Fresh MEX®, Squirrel Systems—Restaurant Management, Aug. 1998.
Micro Systems, Inc., Appendix, User's Manual, 8700 HMS Version 2.10, micros Systems, Inc., 1995-1997.
Micro Systems, Inc., Chapter 1-11, User's Manual, 8700 HMS Version 2.10, micros Systems, Inc., 1995-1997.
Micro Systems, Inc., Full Service Operations, Micros 3700 Point-of-Sale System, Micro Systems, Inc., Nov. 11, 1996.
Micro Systems, Inc., New Products, Micros 3700 Point-of-Sale System, Micro Systems, Inc., Nov. 11, 1996.
Micro Systems, Inc., Quick Service Operations, Micro Systems, Inc., Nov. 11, 1996.
Micro Systems, Inc., All About Us, Micro Systems, Inc., Nov. 11, 1996.
Micro Systems, Inc., Full Service Operations, Micro Systems, Inc., Nov. 11, 1996.
Micro Systems, Inc., 8700 HMS Product Overview, Micro Systems, Inc., 2000.
Micro Systems, Inc., Micros Hand-Held TouchScreen, Micro Systems, Inc., Sep. 1992.
Micro Systems, Inc., The Micro 2700 HMS Touchscreen, Micro Systems, Inc.
RMS Touch, RMS-Touch—Touch Screen Restaurant Management System Product Description, RMSTouch.com, Feb. 15, 1997.
RMS Touch, Company Profile RMS, Touch.com, Integrated Restaurant Software, Feb. 15, 1997.
Elite32 Restaurant System, Compuwave Technologies Inc., 2000.
POS Infrared Restaurant System, Cornpuwave Technologies Inc., 2000.
Wireless POS Drive-Through System, Compuwave Technologies Inc., 2000.
Compuware Technologies Approved as Supplier to McDonald's Canda, Compuwave Technologies Inc., Sep. 14, 2000
Wireless Restaurant System, Compuwave Technologies Inc., Feb. 7, 2001.
About Us, Compuwave Technologies Inc., Feb. 7, 2001.
Wireless Products, Compuwave Technologies Inc., Feb. 7, 2001.
Micros Systems, Inc., POS Configurator User's Guide, 3700 POS, Micros Systems, Inc., 1998.
Micros Systems, Inc., New Products, Micros Systems, Inc., Nov. 11, 1996.
Rita Marie Emmer, Marketing Hotels: Using Global Distribution System, Cornell Hotel and Restaurant Administration Quarterly, 1993, 34; 80, DOI: 10.1177/001088049303400614.
T. Imielinski, Adaptive Wireless Information Systems, 1994.
IBM, POS Computer, 1998.
Krishna Bharat, Migratory Applications.
Andrew Fano, Shopper's Eye: Using Lcoation-based filtering for a shopping agent in the physical world, 1998.
Len Lewis, Opening the gates, Progressive Grover, Jul. 1998.
Arthur Keller, The DIANA approach to mobile computing, CiteSeer, 1995.
A Chavez, A real-life experiment in creating an agent marketplace, PAAM, 1997.
Richard De Santa, Are you into your customers?, Supermarket Business, Jan. 1997.
Barron Housel, WebExpress: a system for optimizing web browsing in a wireless environment.
Carrie Lehman, Service connects restaurants, customers via orders by Internet, Alaska Journal of Commerce, Apr. 28, 1997.
Jennifer Rowley, Internet food retailing: the UK in context, ProQuest LLC, 1998.
John Soeder, Cyber Solicitation, Restaurant Hospitality, Sep. 1997.
Webpage, http://web.archive.org/web/201 01204100846/http://www.grubhub.com/, GrubHub, Inc., Oct. 29, 2010.
U.S. Appl. No. 60/131,119, filed Apr. 27, 1999, Robert Showghi.
U.S. Appl. No. 60/083,651, filed Apr. 30, 1998, Theodore Chen.

* cited by examiner

Cafe Bold

Cafe Bold Info
Does Not Offer Online Ordering

Beverages

| | | | |
|---|---|---|---|
| Juices | $2.00 | Freshly Squeezed Orange Juice | $4.00 |
| Coke | $1.50 | Sprite | $1.50 |
| Club Soda | $1.50 | Iced Tea | $1.50 |
| Materva | $2.50 | Malta | $2.50 |
| Shakes | $4.00 | Milk | $1.00 |
| Hot Chocolate | $2.00 | Tea | $2.00 |
| Coffee | $1.50 | Cappuccino | $3.00 |
| Espresso | $3.00 | Latte | $3.00 |
| Cafe Con Leche | $3.00 | Mocha Cappuccino | $4.00 |

Tapas

| | | | |
|---|---|---|---|
| Cuban Tamal | $3.00 | Papa Rellena | $4.00 |
| Yuca Rellena con Carne | $4.00 | Puerto Rican Pastales | $4.00 |

Your Order

What would you like?
To start your order, choose and item on the left.

grubhub.com
happy eating

```
<html>
<head>
<script type="text/javascript" src=
"http://www.grubhub.com/gulp.action?affid=AFFILIATE&id=RESTAURANT_IDENTIFIER&mode=JS"></script>
</head>
<body>
<p>Some existing content</p>
<div id="gulp-container"></div>
<p>Some more content</p>
</body>
<script type="text/javascript" >
gulp.init ("#gulp-container");
</script>
</html>
```

*Fig. 8a*

```
<iframe src="http://www.grubhub.com/gulp.action?affid=AFFILIATE&id=RESTAURANT_IDENTIFIER&css=CSS_URL"
width=900px" height=550px"></iframe>
```

```
<iframe src="http://www.grubhub.com/gulp.action?affid=WEBLET&ID="WIDTH=900PX" HEIGHT=550PX">
</iframe>
```

```
1
2
3
4
5
6  <!DOCTYPE HTML PUBLIC "-/ /W3C/ /DTD HTML 4.01/ /EN"
   "http:/ /www.w3.org/TR/html4/strict.dtd">
7  <html>
8  <head>
9      <style type="text/css">
10         #gulp-container  {
11             background-color: transparent;
12             margin-left: auto;
13             margin-right: auto;
14         }
15     </style>
16
17     <link rel="stylesheet" type="text/css" href="styles/gulp.css">
18
19     <script type="text/javascript" src="scripts/gulp.min.js"></script>
20     <script type="text/javascript">
21         var _gaq = _gaq || [] ;
22         _gaq.push(['_setAccount', 'UA-30905-1' ]);
23         _gaq.push(['_setCustomVar', 1, 'affId', '1000', 2]);
24         (function() {
25            var ga = document.createElement('script');
26            ga.type = 'text/javascript';
27            ga.async = true;
28            ga.src = ('https:' == document.location.protocol ? 'http:/ /ssl' :
   'http:/ /www') + '.google-analytics.com/ga.js';
29            var s = document.getElementsByTagName('script') [0];
30            s.parentNode.insertBefore(ga, s);
31         }) ();
32                                                                         152
33         gulp.init( { serviceAddress :
   "/services/t/thoquxkfyxeyemvbnjxy5q8nsklbgotj3vwbgtvjeiuumf6kc5xeskrxhuz0uchf/",
34             eventWatcher: function(event) {
35                 _gac.push)['trackPageview', event]};
36
37         },
38             layout: "large"}, "#gulp-container" ;
39     </script>
40  </head>
41     <body style="background: transparent;">
42         <div id="gulp-container"></div>
43     </body>
44  </html>
```

Fig. 10

SCRAPING RESISTANT SYSTEM AND METHOD FOR PLACING ORDERS THROUGH AN INTERNET SHOPPING SERVICE

CROSS REFERENCE TO RELATED APPLICATIONS

This application makes reference to U.S. patent application Ser. No. 13/337,347, titled "UTILITY FOR DETERMINING COMPETITIVE RESTAURANTS," filed on Dec. 27, 2011, which is hereby incorporated by reference in its entirety.

FIELD OF THE INVENTION

The present invention relates to a system and method for providing network based applications, such as Internet search engines, social media networks, and recommendations sites, access to a shopping service's content. More particularly, the invention relates to a system and method for providing network based applications access to a small portion of a shopping service's content to prevent a malicious user from extracting additional valuable content from the shopping service. More particularly still, the invention relates to a system and method for providing third-party services access to menu data and ordering capabilities of a restaurant service.

DESCRIPTION OF THE PRIOR ART

Web data extraction, which is also referred to as web harvesting and web scraping, has become common on the Internet. Web data extraction is the process of automating data extraction from web sites using a software entity known as a bot or web crawler. Web data extraction is used for a wide variety of purposes, including analysis of weather data, comparing prices across numerous electronic retailers, population of search engine databases, and rapid detection of important news events. However, web scraping technology has also given rise to a cottage industry that effectively focuses on conversion of content from established websites for the purpose of creating competitor websites at a fraction of the cost that it would take to build a similar content collection legitimately.

Bots use a number of different techniques to gather information from target websites. Generally, however, bots attempt to mimic the actions that a human being would take when using the website. For example, and with reference to FIG. 1, which is the main entry for grubHub.com, a user would generally enter her general location, such as "Naperville, Ill.", as well as the type of food she would like, such as "Pizza", and press the "Find Restaurants" button. A list of restaurants, such as that displayed in FIG. 2 would then be displayed. A bot that wanted to copy content would then follow links to information about each of the restaurants, such as its address, telephone number(s), and menu, and copy that information to a database. Accordingly, with very little cost, a competitor could potentially duplicate a database of restaurant menus that was assembled only with great effort and expenditure.

Various methods have been employed in the past to combat web scraping. First, many websites implement "terms of use" that prohibit copying content outside of certain narrow exceptions; i.e., indexing the entry page of a site for inclusion in a web search engine. In addition, certain bots, such as web search engines, look for a file referred to as "robots.txt" in the root hierarchy of a web page, and, if it is found, will not index, crawl, or scrape the site. Unfortunately, adherence to this standard is voluntary; a web crawler that is designed to steal content does not have to honor the "robots.txt" file. In addition, visual identification of garbled text and/or images, or the identification of an audio file, can be required to access protected content. However, this type of "roadblock" detracts from a pleasant user experience, and, accordingly, is disfavored for sites that actually seek to sell goods or services to web surfers.

Certain content aggregating websites, such as restaurant services, may benefit from allowing other sites to access their content. For example, it may be useful to allow a search engine to display an option for ordering through the restaurant service when a search is conducted of a member restaurant. However, the search engine company will desire to maintain the web surfer on its own site. The traditional solution to this problem has been for the restaurant service to develop an application programming interface ("API"), and for the search engine to enable the desired features using, the restaurant service's API. Accordingly, to access the restaurant service's content, the search engine would have to effectively build a customized application that allowed for placing orders to member restaurants of the restaurant service, which could require considerable effort and expense. While the expenditure of such effort may make financial sense from the viewpoint of a large search engine, other smaller web-entities could find the effort and expense involved prohibitive.

In addition, the restaurant service would have to share data with the third-party, which, depending on how the third-party implemented their offering, could enable a web scraper to circumvent the content protections of the restaurant service, and obtain, for example, menu data for all member restaurants within the restaurant service's database. For example, a restaurant service may assign each of its third-party partners an API Key, such as, for example, "APIKEY99". In addition, it will generally use a database key, such as an incrementing unsigned integer, for each restaurant; i.e., "Pancake Cafe" of Naperville, Ill., may be assigned restaurant ID "1000". However, with access to these pieces of information, a web crawler could potentially copy the restaurant service's entire database of content.

In the field of restaurant services, certain restaurants may consent to have their menu displayed by a restaurant service, but may not desire to accept orders through the restaurant service. The restaurant service may agree to such an arrangement, as the restaurant service will want to maintain mindshare among diners irrespective of the restaurant that they desire to purchase from. However, if a diner is "on the fence" about a dining decision, and may choose to order from a restaurant that accepts orders through the restaurant service or one that does not, it is in the interest of the restaurant service to steer the diner to an "in-network" restaurant. However, present restaurant services do not provide any means of doing so.

OBJECTS OF THE DISCLOSED SYSTEM AND METHOD

An object of the disclosed system and method is to improve the resistance to content extraction through automated means for content based web sites;

Another object of the disclosed system and method is to allow third party access to the content of a content based web site while providing for resistance to content extraction through the third party by automated means;

Another object of the disclosed system and method is to limit access by third parties to specifically identified content of a content based web site;

Another object of the disclosed system and method is to track access by third parties to content of a content based web site;

Another object of the disclosed system and method is to provide recommendations to diners looking for a specific restaurant that does not provide ordering through a restaurant service;

Other advantages of the disclosed system and method will be clear to a person of ordinary skill in the art. It should be understood, however, that a system, method, or apparatus could practice the disclosed system and method while not achieving all of the enumerated advantages, and that the protected system and method is defined by the claims.

SUMMARY OF THE DISCLOSED SYSTEM AND METHOD

The disclosed system and method achieves its objectives through the use of a token that is provided by the content-based website to the third-party. The token corresponds to the particular third-party's API key as well as a specific database identifier, such as a restaurant ID. In one embodiment of the disclosed system, a third-party server maintains a first set of data in a local database based on data provided to it from a restaurant service's database. When a web browser requests access to protected data, such as when the web browser wants to place an order, a handshake is conducted between the third-party server and an API server controlled by the restaurant service to provide the third-party server with a token. The token is then provided to the web browser, which can use the token to place calls directly with the API server. The token is mapped by the API server to a specific API Key and Restaurant ID combination, and is used by the web browser to make calls to the API server. Calls from the web browser to a different restaurant ID are ignored. In preferred embodiments of the disclosed system and method, the token is a random alphanumeric string. Note that both the characters within the string, and the length of the string can be randomized.

In an alternate embodiment of the disclosed system and method recommendations for alternate restaurants are generated by a restaurant service server when a user searches for a subject restaurant that is not a member of the restaurant service. In this embodiment, the restaurant service server receives a request for at least one suggested alternate restaurant. Based on information contained in a restaurant service database, such as, for example, the location of a subject restaurant compared to other restaurants, at least one alternate restaurant is suggested by the server. Many other types of information can be used to generate suggestions as well, such as, for example, cuisine types, menu items, and diner ratings.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 4 is an image of a third-party website displaying unprotected content drawn from a restaurant service;

FIG. 5 is an image of a third-party website displaying protected content drawn from a restaurant service;

FIG. 8a is HTML code for embedding ordering capabilities for a restaurant service into a frame of a third-party web page;

FIG. 8b is HTML code for embedding ordering capabilities for a restaurant service within a modal dialog box displayed by a third-party web page;

FIG. 9 is HTML code used to displayed a modal dialog box with the restaurant's service's protected information; and FIG. 10 is a web page displaying recommendations for an alternate to a restaurant that does not accept orders through a restaurant service.

DETAILED DESCRIPTION OF THE ILLUSTRATED EMBODIMENT

Figure 1:
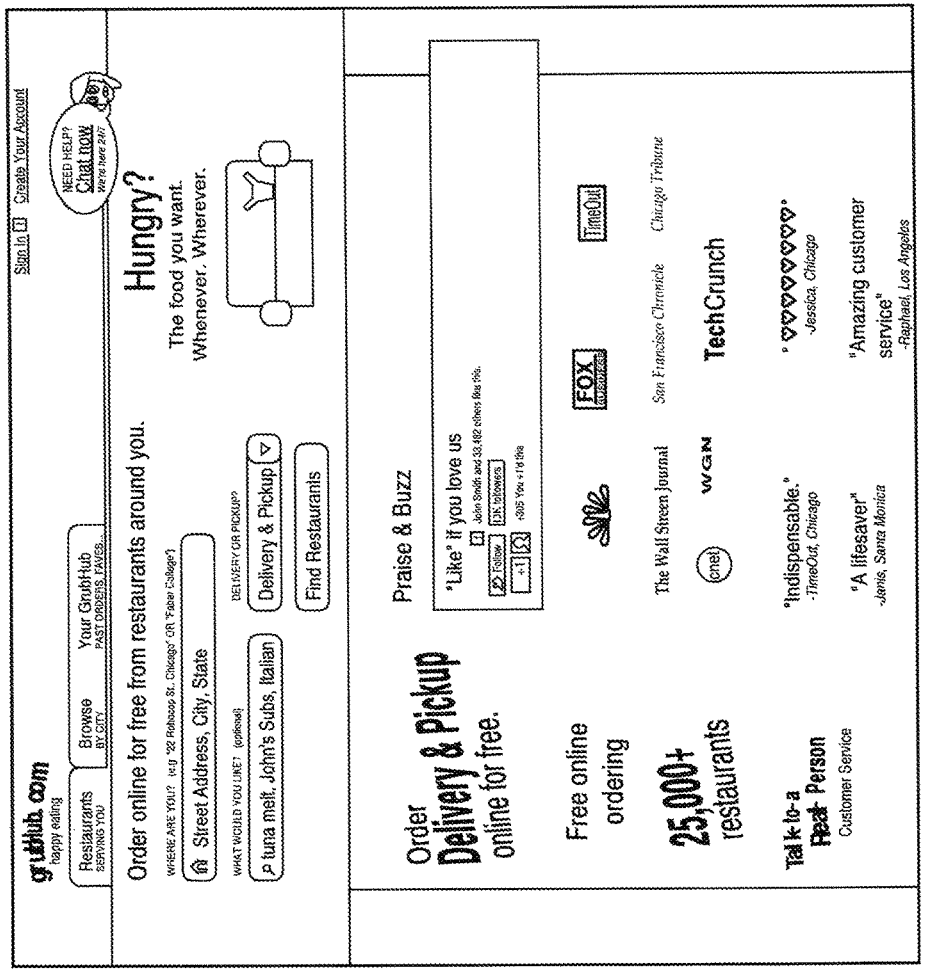
FIG. 1 is an image of the front page of a restaurant service.
Figure 2:
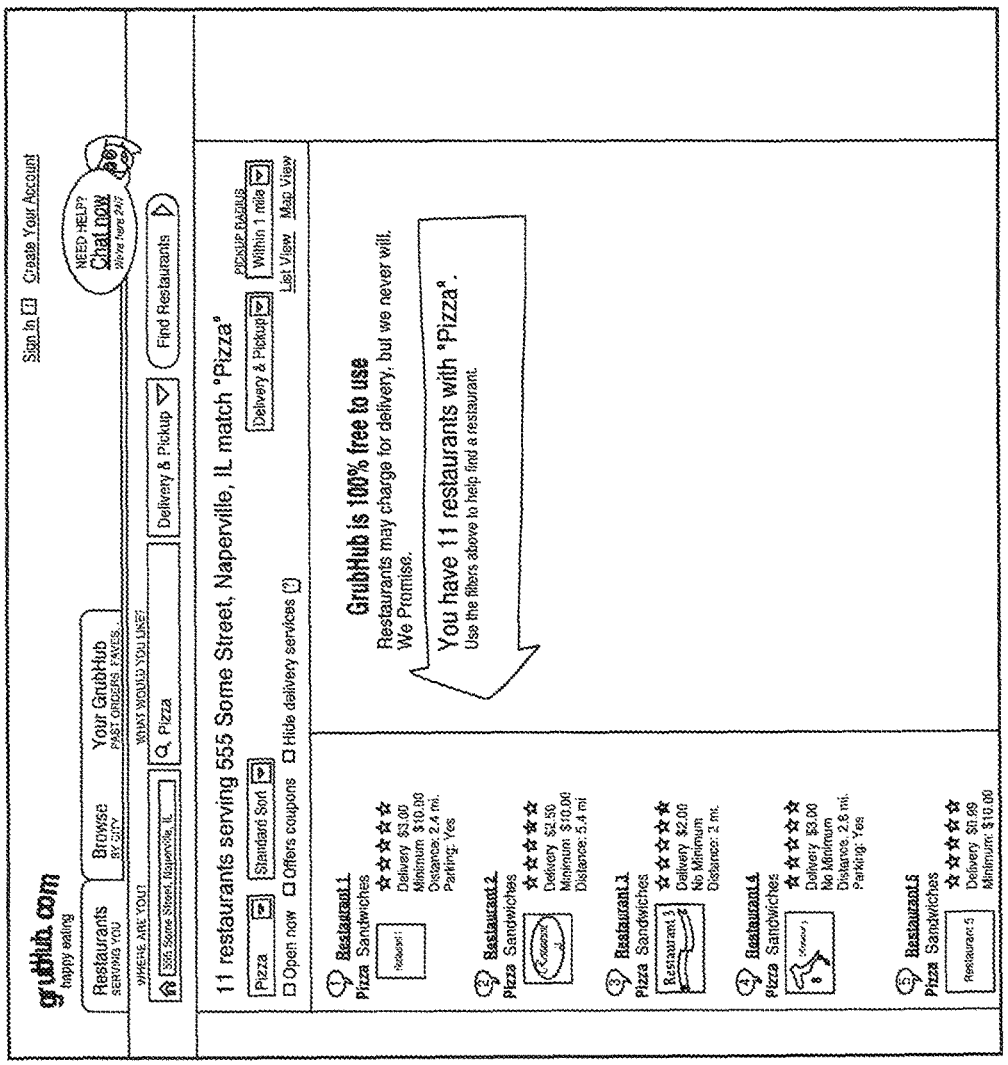
FIG. 2 is an image of search results for the restaurant service of FIG. 1.
Figure 3:
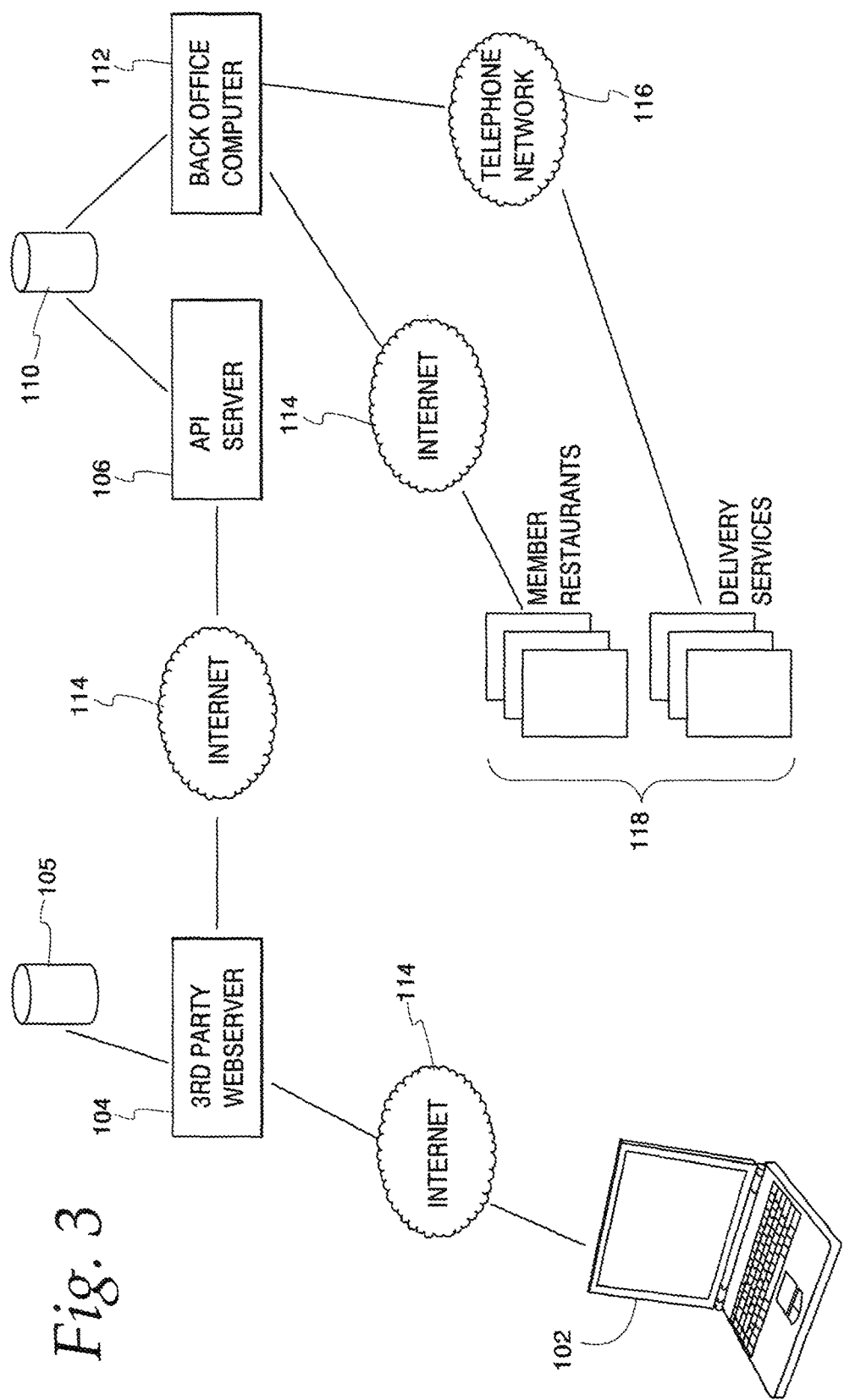
FIG. 3 is a system diagram of a third-party service that draws content from a restaurant service.

Turning to the Figures and to FIG. 3 in particular, a simplified diagram of a third party system for accessing content on a content based website is depicted. As depicted, the content based website is a restaurant service. However, this disclosure applies equally well to other types of content, based websites. For example, web sites focused on shopping for wedding planners, florists, resorts, trade show venues, and legal services could all advantageously make use of the disclosed system and method.

In FIG. 3, a web browser 102 accesses a third-party website 104. The third-party website 104 could be one of many different types of website. For example, it could be a search engine, and the web surfer could be conducting a web search for a specific type of content, such as, for example, a specific restaurant. Alternatively, the third-party site could be a local search site, a social networking site, a user review site, or another type of website. The task of the web surfer would, of course, likely be different depending on the type of site.

The system of FIG. 3 also includes an API server 106 which provides the third-party web server 104 with programmatic access to a restaurant service. The third-party web server 104 is coupled to a local database 105. In addition, a database 110 networked with the API server 106 organizes and stores the restaurant service's content. The database 110 also holds an order queue. A Back Office Computer 112 services the order queue, and delivers orders to member restaurants over a wide area data network 114 or a public telephone network 116. Member restaurants and delivery services 118 accept and fulfill orders.

As explained herein, the API server 106 provides a full API 107, and a lite API 108. The full API 107 provides full programmatic access to the content of the restaurant service, as is consistent with prior art fully developed application programming interfaces. Using the full API 107, a third party service can obtain access to the content of the restaurant service, such as restaurant addresses, phone numbers, and menus, while presenting the content to web surfers in a highly customized manner.

Figure 4:
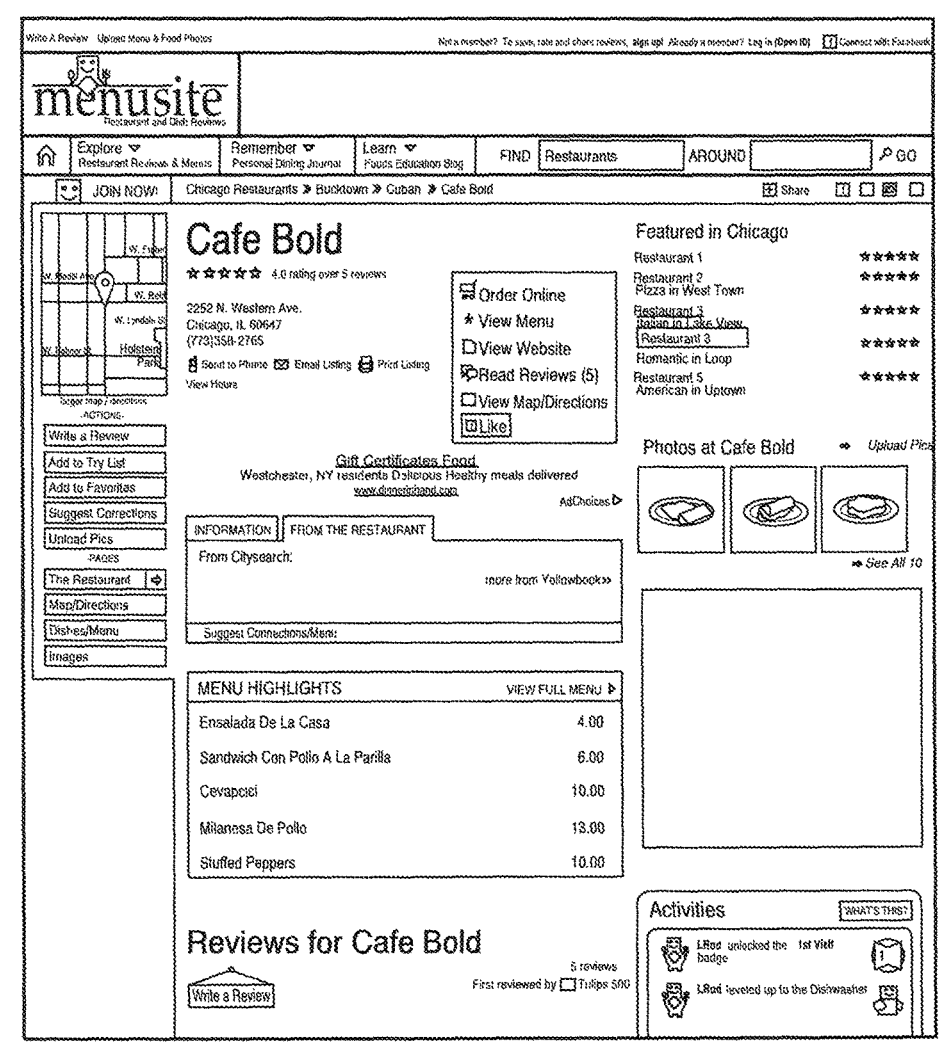

The lite API 108 provides a lightweight, easy to integrate package to third-party sites that is tailored to allowing sites to (1) display limited information about restaurants within the restaurant service's database, (2) place an order from a member restaurant, or (3) obtain a recommendation for a member restaurant when the web surfer is viewing a non-member restaurant. FIG. 4 depicts a typical third-party website, in this case a review site specializing in providing restaurant reviews. By pressing on the "Order Delivery" link, the ordering interface of FIG. 5 is brought up.

Figure 6:
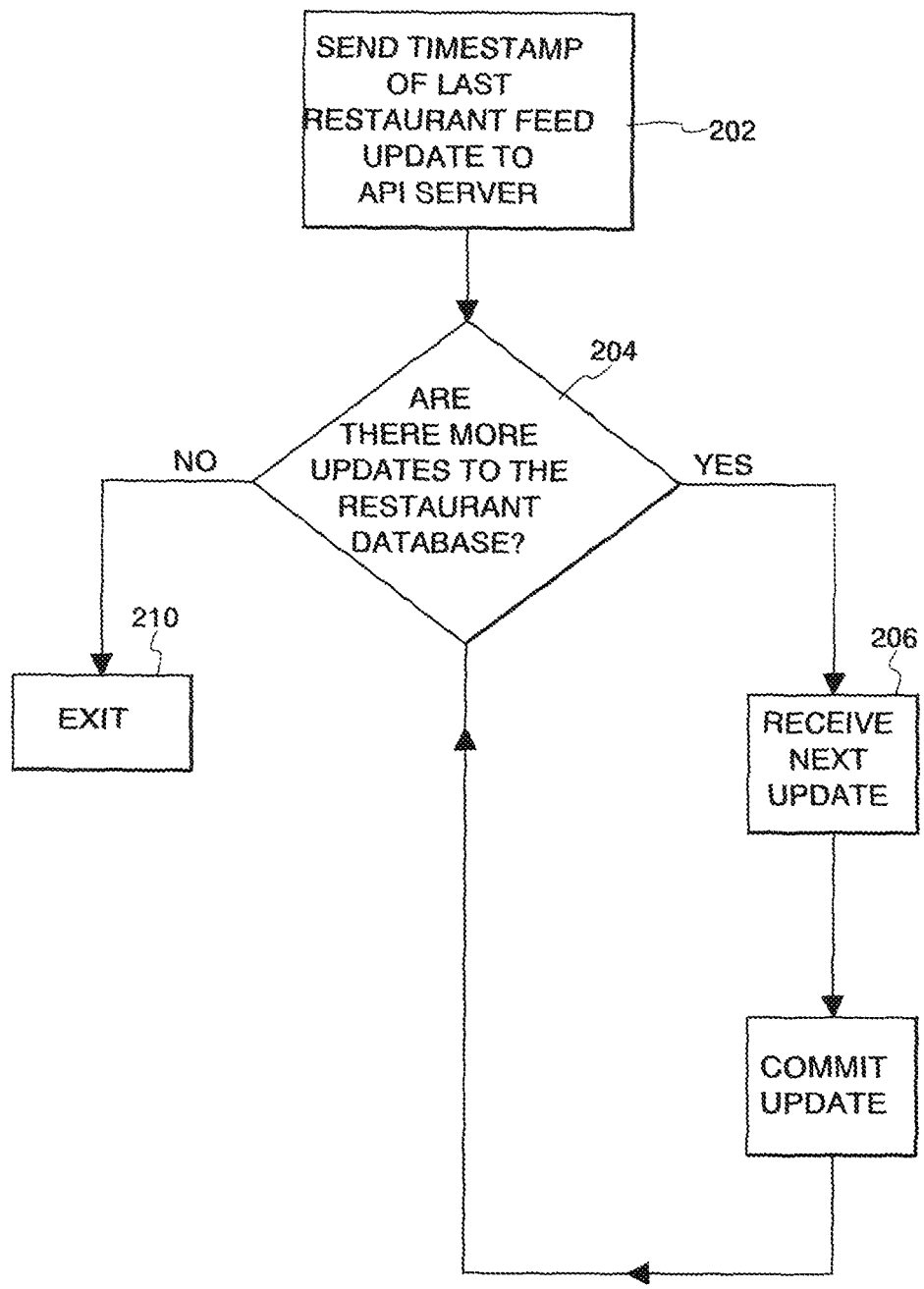
FIG. 6 is a flowchart depicting a process by which a third-party server can update its local database with information from a restaurant service.

The information that is shown for the displayed restaurant in FIG. 4 was retrieved from the restaurant service database 110 using a restaurant information feed. The operation of the restaurant information feed is illustrated by the flowchart of FIG. 6. In step 202 a message containing the third-party's API key and a timestamp indicating the last update to the third-party's local restaurant database 105 is sent from the third-party server 104 to the API server 106. Any standard timestamp format can be used. If this is the first time that the third-party is updating its database 105, the timestamp can indicate an impossible time, such as, for example, a time in the distant past or future. The third-party server will then receive a message indicating whether there are any updates to the restaurant services database 110 in step 204. If there are updates, execution transitions to step 206, where the third-party server 104 receives the next update from the API server 106. In step 208, the third party server commits the update. Execution then transitions back to step 204. If there are no further updates execution transitions from step 204 out of the update process in step 210.

It should be noted that the process of FIG. 6 is technology agnostic. For example, the message format used to communicate between the third party server and the API server can be based on XML, simple packets, or some other technology. Furthermore, while a pull scheme has been described, a push scheme could easily be adapted for this use.

The process of FIG. 6 allows for the third-party to acquire basic data regarding the restaurants stored in the restaurant service's database. This data is as vulnerable to extraction as any other data provided by the third-party. However, other data, such as, for example, restaurant menu data, is not delivered using the process of FIG. 6.

The third-party can use the limited data acquired through the process of FIG. 6 to populate a page of their own design. For example, this data can be returned with search results or can be used to construct a review page, like that depicted in FIG. 4. In addition, the disclosed system and method allows for the integration of protected content, such as menus, into third-party sites as well.

As mentioned in the background of this application, a content based website generally wants to keep the internal details of its access protocol private from non-trusted entities, such as the public. Accordingly, in a scheme that makes use of an API key and a database identifier to retrieve detailed information about particular content items, it is important to keep the API key and the database identifier secret from non-trusted entities. The disclosed system and method accomplishes this by use of a temporary token that is temporarily mapped to a particular API key and database identifier. The API server, or some other computer controlled by the content based website stores a table, or some other mapping structure, that maps the temporary token to a specific API key and database identifier combination. Accordingly, the use of the token can be restricted to a particular restaurant, and aberrant calls can be traced to customers originating from a particular third-party partner.

The token can be a random length and random content string, such as, for example, "abcdefg", or "zyxwvutsr123". Of course, the string should have no relationship to the API key or the database identifier, aside from the mapping maintained by the restaurant service's computers. Either of the above tokens could map to, for example, the API key for a specific third party, and a specific restaurant ID, such as 109, which can map to "Café Bolero" in the database of the restaurant service. The token can be assigned a time period that it is valid, such as, for example, three hours, and is submitted with all calls from a web browser 102 to the API server 106 when manipulating menu data, or some other form of protected data. Alternatively, the token 152 may be valid for all-time.

Once the token 152 is assigned, the diner can utilize the token 152 to make requests directly to the API server 106. In particular, the web browser 102 can request menu information for the restaurant associated with the token 152, and can request to purchase an item from the restaurant.

Figure 7:
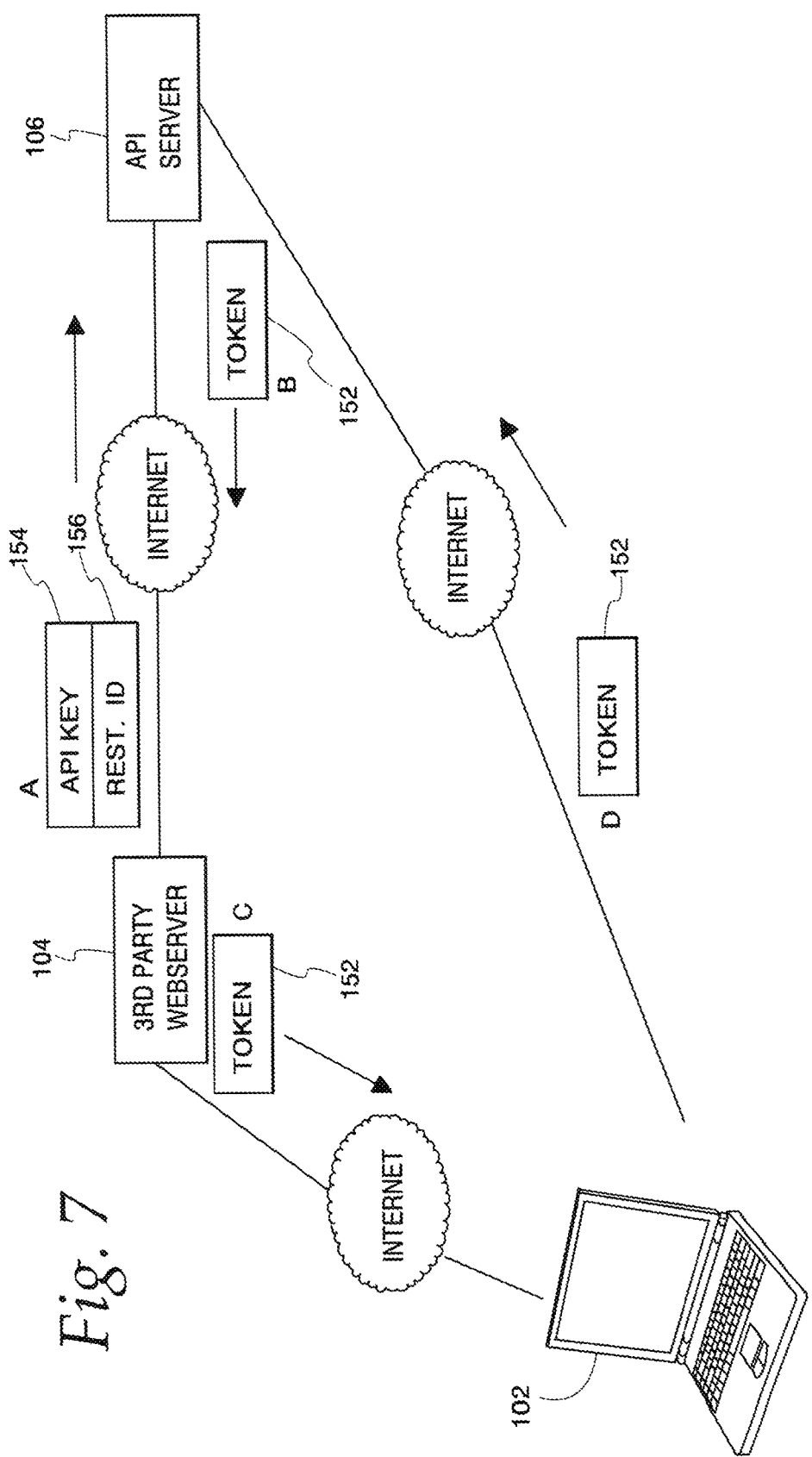
FIG. 7 is a graphical depiction of a token acquisition process for a web browser interacting with a third-party website that draws content from a restaurant service.

FIG. 7 graphically illustrates the process of obtaining a token. In particular, after a web browser 102 has requested access to protected information, such as, for example, viewing a member restaurant's menu, the third party server 104 sends a message to the API server 106 containing the third party's API Key 154 and a restaurant identifier 156 for the restaurant that the web browser 102 has requested access to. The API server 106 responds with a message containing a token 152 corresponding to the provided API key 154 and restaurant ID 156. The third party server 104 provides the token to the web browser 102, who can then use the token to directly communicate with the API Server 106, and receive protected information, such as, for example, restaurant menus. Once the token 152 is obtained, the web browser 102 can issue requests to the API server 106 for the specific restaurant ID 156 that is mapped to the token 152. Any other restaurant ID will be rejected by the API server 106 as not allowed by the token 152.

In addition to the use of tokens to hide implementation details from malicious web crawlers, the disclosed system and method also seeks to enable integration with third-party partners' websites with a minimum of programming. FIGS. 8a and 8b depict two ways of embedding the disclosed ordering capabilities in a third-party web page. In particular, FIG. 8a illustrates how Javascript can be used to embed the ordering capabilities directly into a third-party web page, while FIG. 8b depicts how the ordering capabilities can be embedded in an iFrame, so that a modal dialog containing the ordering capabilities is displayed. Note that these web pages would be held in an container on the third-party's web server 104, and would not be visible to the outside world; rather these pages are used to generate pages for use by diners. In the case where the menu is displayed as a modal dialog, the HTML that would be sent to the diner's browser could be similar to that of FIG. 9. In particular, the token 152 is passed to a function within a javascript tag, and has no discernible relationship to an API Key 154 or a restaurant ID 156.

Figure 10:
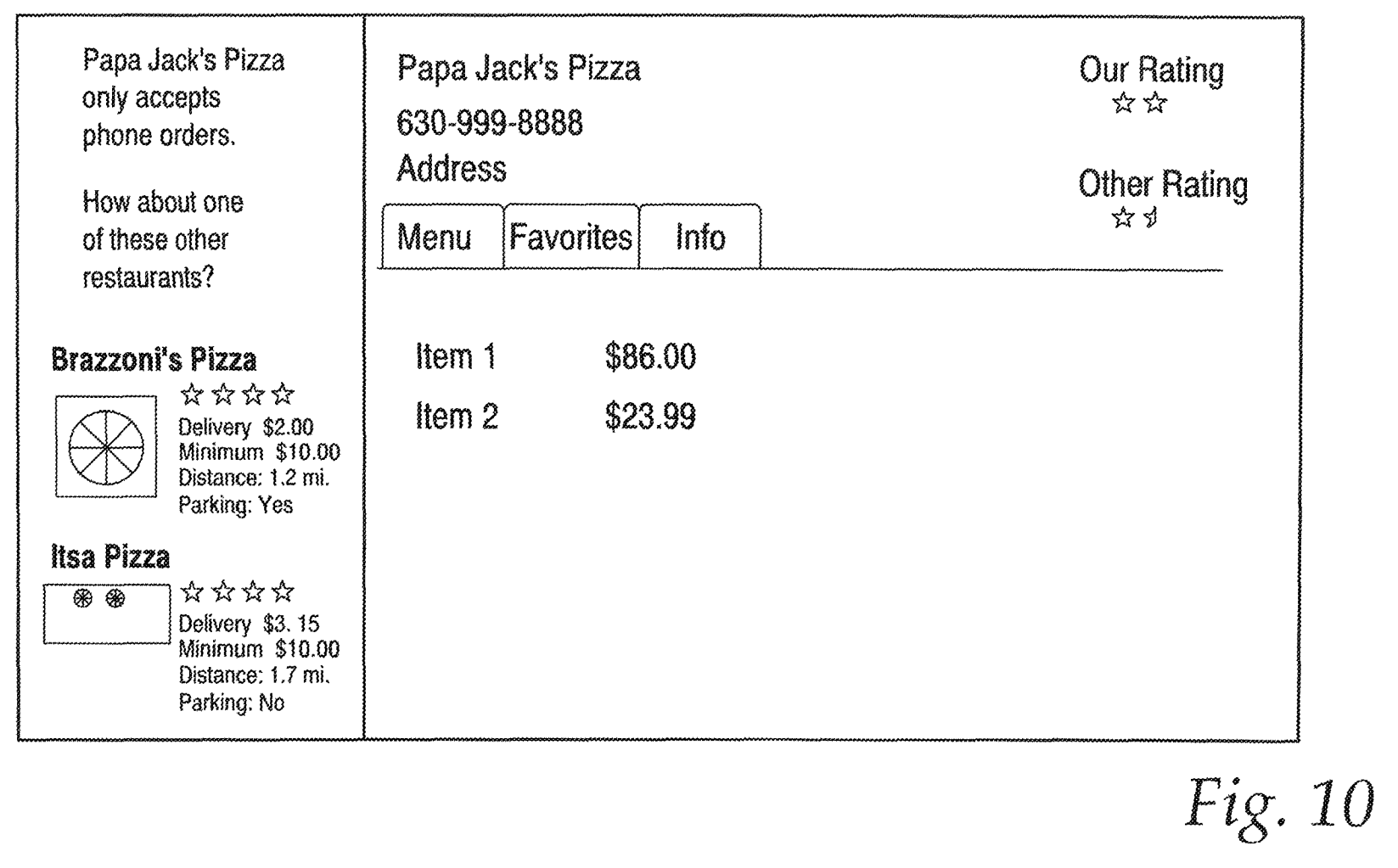

Another feature of the disclosed system and method is to provide suggestions to diners for alternative restaurants. In particular, when a diner searches for a restaurant that allows their menu to be displayed, but does not accept orders through the restaurant service, it can be advantageous to the restaurant service to provide suggestions for alternative restaurants. One way that suggestions can be generated is to examine the cuisine types that are offered by the searched for restaurant, and search the restaurant service's database for restaurants that are geographically close to the searched for restaurant. For example, if a web surfer searches for "Papa Jack's Pizza" in Naperville, Ill., which does not accept orders through a restaurant service, recommendations of "Brazzonni's" and other restaurants, as depicted in FIG. 10.

Suggestions for alternative restaurants can also be obtained through any of the systems and methods for identifying the competitor of a restaurant discussed in U.S. patent application Ser. No. 13/337,347, which was earlier incorporated by reference. In particular, using the information stored within the restaurant service's database, the original restaurant for which the user was looking will be treated as the subject restaurant, and its various characteristics, such as, for example, cuisine types, menu items, seasonal characteristics, etc., can be used to determine suggestions for alternatives to the subject restaurant.

Obviously, many additional modifications and variations of the present invention are possible in light of the above teachings. Thus, it is to be understood that, within the scope of the appended claims, the invention may be practiced otherwise than is specifically described above.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A non-transitory computer-readable storage medium storing one or more instructions which, when executed by one or more processors of an API server, causes the one or more processors to perform:
   receiving an update message from a third-party server, the update message including an API key of the third-party server and a timestamp;
   providing, using the received timestamp, an information feed to the third-party server, the information feed including a first set of information associated with a service;
   receiving a first message from the third-party server, the first message including a first merchant identifier associated with the service of additional information, and the API key identifying the third-party server;
   generating a first token, mapping the first token to the first merchant identifier associated with the service and to the API key of the third-party server, storing the mapping in a mapping database of a plurality of tokens to merchant identifiers associated with services of additional information and API keys of third-party servers;
   sending a second message to the third-party server including the first token;
   receiving, from a web browser, a request for the additional information, wherein the request includes a second token;
   comparing the second token in the request with the plurality of tokens in the mapping database;
   determining a second merchant identifier corresponding to the second token in the mapping database, and
   either sending the additional information corresponding to the second merchant identifier to the web browser, or identifying a third-party partner using a second API key of the second token and sending to the web browser additional information of a third merchant with an additional data corresponding to the second merchant identifier.

2. The non-transitory computer-readable storage medium of claim 1, wherein the first token is a string of random alphanumeric characters.

3. The non-transitory computer-readable storage medium of claim 1, wherein the first token is a random length.

4. The non-transitory computer-readable storage medium of claim 1, wherein the first token corresponds uniquely to both the API key and the first merchant identifier.

5. The non-transitory computer-readable storage medium of claim 1, wherein the first merchant identifier is a restaurant identifier.

6. The non-transitory computer-readable storage medium of claim 1, wherein the API server receives the request for additional information from the web browser without passing through the third party server.

7. The non-transitory computer-readable storage medium of claim 1, wherein the first set of information includes a listing of restaurants and the additional information is a menu for a particular restaurant associated with the first merchant identifier.

8. The non-transitory computer-readable storage medium of claim 1, further comprising:
   in response to determining that the request is not for the second merchant identifier the second token in the request maps to, dropping the request received from the web browser.

* * * * *